(12) United States Patent
Nakamura et al.

(10) Patent No.: US 7,305,462 B2
(45) Date of Patent: Dec. 4, 2007

(54) DATA STORAGE SYSTEM AND CONTROL METHOD THEREOF

(75) Inventors: Yasuaki Nakamura, Fujisawa (JP); Toshio Nakano, Chigasaki (JP); Akinobu Shimada, Chigasaki (JP); Tatsuya Murakami, Odawara (JP); Hiroshi Morishima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 723 days.

(21) Appl. No.: 10/077,966

(22) Filed: Feb. 20, 2002

(65) Prior Publication Data

US 2003/0061331 A1 Mar. 27, 2003

(30) Foreign Application Priority Data

Sep. 27, 2001 (JP) .............................. 2001-295397

(51) Int. Cl.
G06F 15/173 (2006.01)
(52) U.S. Cl. ...................... 709/223; 709/224; 709/225; 711/111; 711/112; 711/114; 707/10
(58) Field of Classification Search ................ 709/223, 709/224; 707/10; 711/111, 112
See application file for complete search history.

(56) References Cited

U.S. PATENT DOCUMENTS

| 5,625,795 | A  | * | 4/1997  | Sakakura et al. | ............ | 711/148 |
| 5,996,046 | A  | * | 11/1999 | Yagisawa et al. | ............ | 711/114 |
| 6,212,520 | B1 | * | 4/2001  | Maruyama et al. | ............ | 707/10 |
| 6,253,240 | B1 | * | 6/2001  | Axberg et al.   | ............ | 709/223 |
| 6,308,243 | B1 | * | 10/2001 | Kido            | ............ | 711/147 |
| 6,363,457 | B1 | * | 3/2002  | Sundberg        | ............ | 711/114 |
| 6,538,669 | B1 | * | 3/2003  | Lagueux et al.  | ............ | 715/764 |
| 6,598,179 | B1 | * | 7/2003  | Chirashnya et al. | .......... | 714/37 |
| 6,671,776 | B1 | * | 12/2003 | DeKoning        | .............. | 711/114 |
| 6,738,973 | B1 | * | 5/2004  | Rekimoto        | .................. | 718/104 |
| 6,845,395 | B1 | * | 1/2005  | Blumenau et al. | .......... | 709/223 |

OTHER PUBLICATIONS

"VERITAS Volume Manager 3.1 Migration Guide, for HP-UX 11i and HP-UX 11i Version 1.5" Jun. 2-1, Hewlett Packard, Manufacturing Part No. :B7961-90017, pp. 83-88.*

* cited by examiner

*Primary Examiner*—Yves Dalencourt
(74) *Attorney, Agent, or Firm*—Mattingly, Stanger, Malur & Brundidge, P.C.

(57) ABSTRACT

In the configuration of multiple (M units of) disk subsystems shared from multiple (N units of) hosts, having
an exclusive control command that limits access to all disk subsystems temporarily is provided,
using this exclusive control command, configuration information of all multiple disk subsystems, for example, performance and a setting change, are acquired in point of time series and stored in a management server database ("configuration information database"), then managed in a centralized manner,
a function that associates the file that the application uses with the "configuration information database" is provided using a function that detects the position on the logical unit, and
a means that can retrieve the modified contents of the system configuration and time as keys is provided in the "configuration information database".

20 Claims, 5 Drawing Sheets

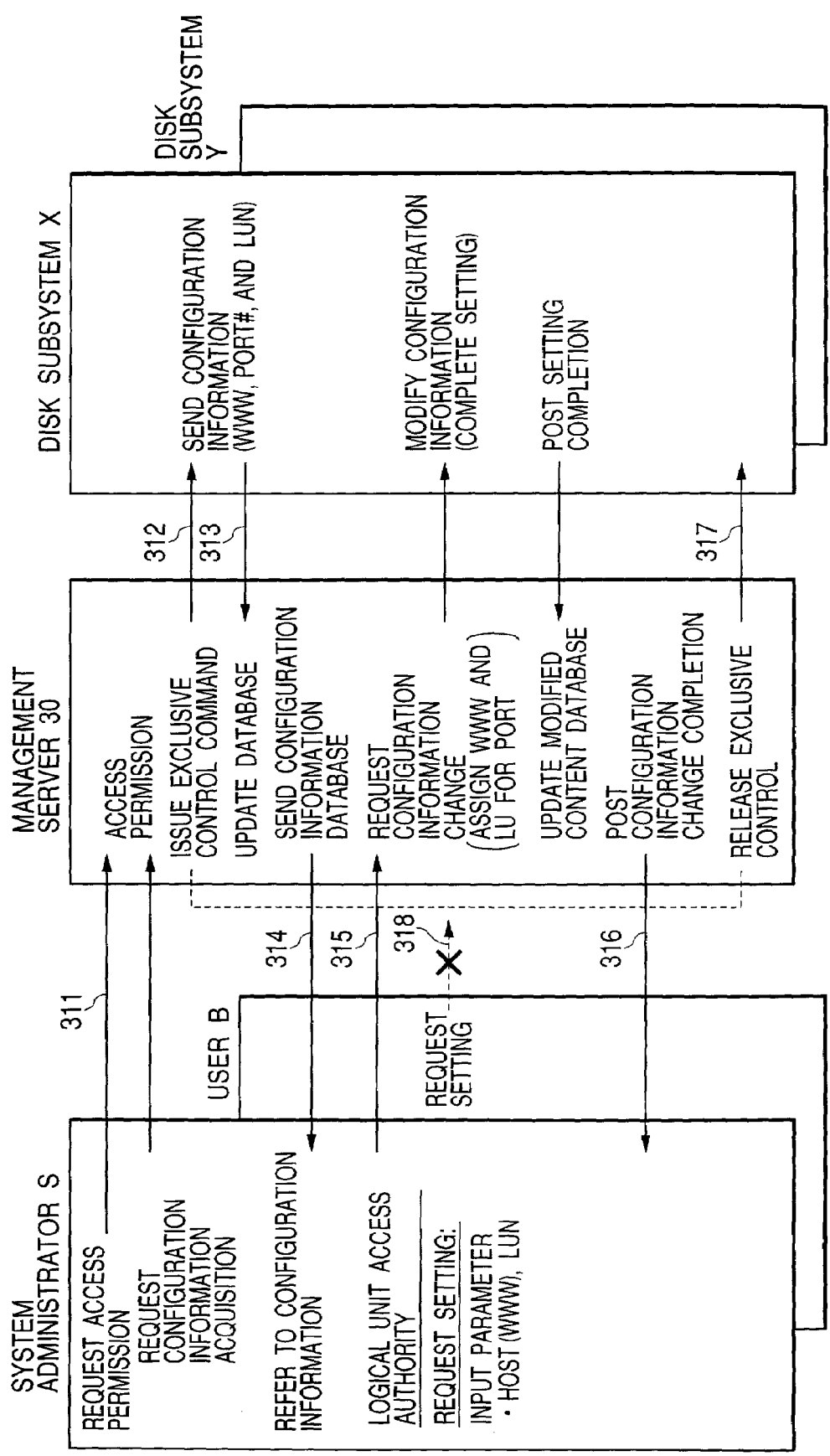

FIG. 4

MANAGEMENT SERVER 30

CONFIGURATION INFORMATION TABLE ~301 (412)

| FILE NAME | ..... | LOGICAL UNIT # | SHARED PHYSICAL UNIT # |
|---|---|---|---|
| File 1 | | 00:01 | 1-1 |
| | | 00:02 | 1-1 |
| | | 00:03 | 1-1 |

SETTING CHANGE HISTORICAL TABLE ~302 (413)

| TIME | SETTING OBJECT CONFIGURATION INFORMATION | MODIFIED CONTENTS |
|---|---|---|
| 2001/6/20 0:00 | LOGICAL UNIT #01:01 | PATH SETTING |
| --- | --- | --- |
| 2001/6/25 11:00 | LOGICAL UNIT #00:03 | PATH SETTING |

PERFORMANCE HISTORICAL TABLE ~303 (414)

| TIME | LOGICAL UNIT # | PERFORMANCE |
|---|---|---|
| 2001/6/20 0:00 | 00:01 | aaa |
| --- | --- | --- |
| 2001/6/25 11:00 | 00:01 | |
| 2001/6/25 12:00 | 00:01 | bbb (bbb<aaa) |

SYSTEM ADMINISTRATOR S

INPUT PARAMETER: ~411
- FILE THAT AP IS USING: File 1
- PERFORMANCE DEGRADATION TIME: JUNE 25, 2001 12:00

ESTIMATED CAUSE OR ADDITIONAL TIME: ~415
- ADD LOGICAL UNIT #00:03 TO SHARED PHYSICAL UNIT 1-1

DATA STORAGE SYSTEM AND CONTROL METHOD THEREOF

FIELD OF THE INVENTION

The present invention relates to a centralized management art of a data storage system (hereinafter merely referred to as a storage system) when multiple computers that use information and multiple external storage systems (hereinafter referred to as disk subsystems) that store information are connected to a network and arranged separately, and more particularly to a management art of the whole storage system that extends over the multiple disk subsystems.

BACKGROUND OF THE INVENTION

In order to perform centralized management of data extending over multiple external storage systems, for example, multiple disk subsystems, the configuration information of each system is acquired and the whole configuration in which the whole system was integrated needs to be defined. Here, the configuration information, includes, for example, setting concerning an internal access path of a disk subsystem, a logical unit, the capacity or access authority of the logical unit and data move, setting concerning data copying between the disk subsystems, setting or acquisition of a performance control mode or performance data, setting of a maintenance method and a fault or user operation event.

In the past, system administrators periodically collected the configuration or performance of a disk subsystem, fault, expansion and other events (hereinafter referred to as events) that will occur under the system using software that a host computer (hereinafter merely referred to as a host) which uses the disk subsystem manages. That is, a system administrator had to connect the host computer to each disk subsystem and acquire the configuration information of these systems, then provide the definition and necessary setting of the whole system configuration using management software by manual operation.

An art for displaying in mapping mode that a logical volume that can access a disk subsystem from a host corresponds to which physical unit of the disk subsystem is disclosed in U.S. Pat. No. 5,973,690. However, there is no suggestion concerning transverse management between multiple disk subsystems.

In order to define the whole configuration in which the whole system was integrated, desirably, a system administrator should collectively perform setting that extends over between the multiple disk subsystems. This is because the configuration of the whole system is defined more easily than it is defined every disk subsystems and the number of times the configuration is checked and redefined is reduced, thereby reducing artificial misoperation. This is because the system operation can also be improved if the setting that extends over between the multiple disk subsystems is performed collectively.

The state is considered in which a certain user A installs a database and another application A in a host computer and multiple disk subsystems are used as an external storage system. Because the size of the file that the application A of the user A uses was reduced, a system administrator S of this external storage system is assumed to have added a logical unit (LU) to a disk subsystem.

However, the disk subsystem may also use another application B (higher performance than for the application A is requested) that the user B uses in another host.

In such case as this, if the added logical unit should have shared a physical resource (physical unit) with a logical unit allocated so that the application B that requests high performance can use it, the addition of this logical unit is affected and performance degradation will be caused concerning the execution of the application B in which importance is attached to the performance.

In other words, although the addition of the logical unit that the system administrator S made and that was made for the user A is a measure for maintaining and increasing the execution of the application A of the user A, the measure will cause degradation of the execution performance of the application B, and is eventually said to be artificial misoperation when it is viewed from the performance aspect of the whole system.

A system administrator normally monitors the performance of an application using a performance monitoring tool. Because the performance monitoring tool monitors the process operating state of the application or the read and write performance of the file that the application uses, a cause in which the addition of the previous logical unit gave rise to the performance degradation of another application cannot be ascertained.

With the sudden spread of the Internet, access requests from many client terminals increase. These access requests are regarded as access from multiple hosts. A storage system that integrates these many types of access also requires a measure that follows the demand of data size, and the opportunity of logical unit expansion in an individual disk subsystem is increasing constantly. It is desired to predict when the logical unit that corresponds to the file that a business-related application uses exceeds a usable capacity and arrange a schedule of planned logical unit expansion. Accordingly, an increasing tendency toward the file size, the position of the logical unit in which the file was stored and the usable capacity are investigated, and the schedule must be arranged from these relationships.

In the prior art, although these pieces of information were collected individually and periodically, there is no means for building these relationships. The measure is no more than a measure that depends on an empirical rule of a system administrator, and the above prediction and planning were very difficult.

SUMMARY OF THE INVENTION

One object of the present invention is to provide a management art for allowing multiple system administrators (L persons) to manage multiple (M units of) disk subsystems transversely and collectively and realize predetermined setting quickly and simply in the configuration of the multiple (M units of) disk subsystems shared from multiple (N units of) hosts.

Another object of the present invention is to provide a management art of a disk subsystem by which an influence that the configuration modification of the disk subsystem has on the performance of the application executed by a host can be grasped.

A further object of the present invention is to provide a management art by which the additional time of the planned logical unit capacity in a disk subsystem can be determined.

The present invention has been made in view of the above circumstances and provides a data storage system and a control method thereof having following features.

1) An exclusive control command that temporarily limits access to all multiple disk subsystems is provided.

2) Using this exclusive control command, the configuration information of all multiple disk subsystems, for example, performance or a setting change, is acquired in point of time series and stores it in a database ("configuration information database") of a management server part, then manages it in a centralized manner.
3) A function of associating the file that an application uses with the "configuration information database" is provided using a function of detecting the position of the file on a logical unit.
4) A means that can retrieve the modified contents or time of the system configuration as keys is provided in the "configuration information database".

BRIEF DESCRIPTION OF THE DRAWINGS

Preferred embodiments of the present invention will be described in detail based on the followings, wherein:

FIG. 3 is a drawing illustrating a flow of a procedure in which desired setting that extends over multiple disk subsystems of FIG. 2 are performed collectively;

FIG. 4 is an example of analysis made using the present invention and a drawing showing a flow in which a history of configuration information is traced and a cause of the performance degradation of an application is investigated using the configuration information database that the management server possesses.

DESCRIPTION OF THE PREFERRED EMBODIMENTS

Figure 1:
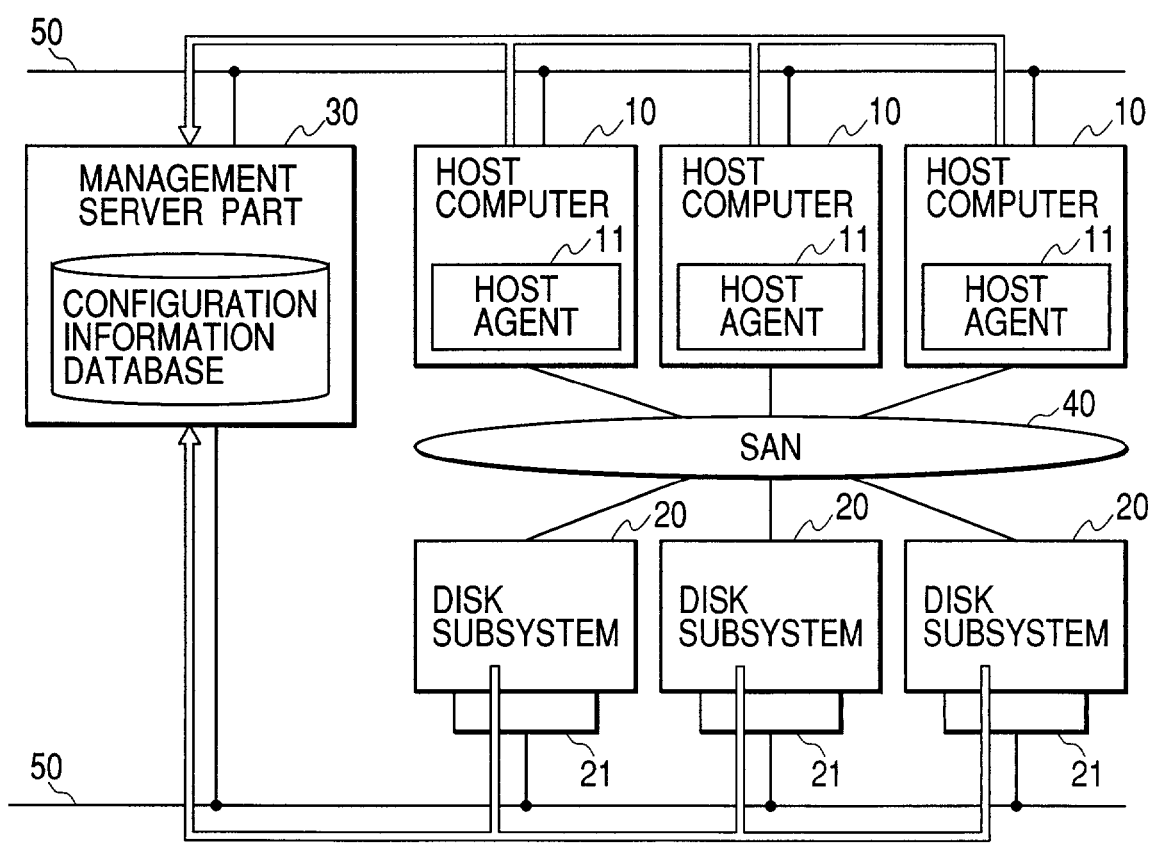
FIG. 1 is a drawing showing an outline of a system in which multiple host computers are provided with multiple disk subsystems that send and receive and share data via a network.

FIG. 1 shows a schematic configuration of the whole system when multiple host computers 10 are connected to multiple disk subsystems 20 that send and receive and share data via an SAN (storage area network) 40. Each disk subsystem 20 is provided with an external connection interface 21 for sending event information in order to define and refer to its own configuration, show performance and data and post a fault.

A management server part 30 is an interface of a local area network (LAN) 50 that differs from the SAN 40 and can be connected to the multiple hosts 10 and the multiple disk subsystems 20. In FIG. 1, only the one management server 30 is shown, but the multiple management servers can also be shown. Further, the management server 30 can also be installed inside the disk subsystems 20 and also be positioned at a place physically separated from these disk subsystems 20. The technical term of a "management server" includes a part of an external storage system having a server function, and is appropriately described as a "management server part".

It is considered that the configuration of the all multiple disk subsystems 20 is defined collectively from a certain management server part 30 extending over between these multiple subsystems. The management server part is merely described as the management server 30 below. An exclusive control command is issued from the management server 30 to the systems 20 so that the management server 30 will be the only one setting means. Here, the exclusive control command indicates a command that occupies the multiple disk subsystems 20 selected optionally in a time zone. The occupancy time may also be about one hour when it is long. However, setting information is created separately and a control method by which setting is performed in a slight occupancy time is prepared. The management server 30 has also a function of checking that the setting terminates normally.

The functional block of the management server 30 is described with reference to FIG. 2.

A user management layer 31 manages multiple users A to C connected to the management server 30. Here, a system administrator is included in a user.

An object management layer 32 manages acquisition of the configuration information of each disk subsystem 20 and a setting request from the user. The object management layer 32 has a configuration information database 321.

An agent management layer 33 issues an exclusive control command to each disk subsystem 20 via a subsystem interface 341 in accordance with a request from the object management layer 32.

An interface layer 34 has the subsystem interface 341 that performs data sending and receiving with each disk subsystem 20 and a host interface 342 that controls access with each host agent 11.

While exclusive control is being performed, the object management layer 32 acquires the configuration, performance and fault and other event information of each disk subsystem 20 and stores them in the configuration information database 321.

The only system administrator (user) whose access was permitted by the user management layer 31 performs the change, expansion, or deletion of parameters of the multiple disk subsystems 20 stored in the configuration information database 321 extending over the same systems 20. As a result, the configuration information database 321 and the configuration information of an actual disk subsystem 20 can match without differing from each other at a predetermined point of time.

The management server 30 releases all the occupied multiple disk subsystems 20 by the agent management layer 33 when the configuration modification, expansion and deletion of the systems 20 are completed by the object management layer 32 also including the registration into its own configuration information database.

Here, the information that is the configuration information database 321 of the object management layer 32 and that the management server 30 handles relates to the configuration information about the setting concerning an internal access path of each disk subsystem 20, a logical unit, these capacity and access authority and data move, setting concerning data copying between disk subsystems, setting of the performance or control of each disk subsystem, acquisition of the performance data of each disk subsystem, setting of a maintenance method and fault and user operation events.

<Information Acquisition Timing>

The information acquisition timing of the disk subsystem 20 and the host 10 is before the configuration is instructed to the system 20 when the only system administrator (user) accesses the management server 30 and the management server 30 defines the configuration of the system 20. On the other hand, the acquisition timing is also established when the fault, maintenance and other events of the disk subsystem 20 occurred. Specifically, the acquisition timing is established in the following items.

1) When the event is recognized and information is acquired by the management server 30 through a periodic inquiry into each disk subsystem 20.

2) Further, when the fault and maintenance events that the disk subsystem 20 detected were posted from the subsystem interface 341 (FIG. 2) to the agent management layer 33.

In the case of 2), the agent management layer 33 to which an event, such as a fault, was posted posts the event to the object management layer 32 of the upper layer using an interrupt function and the management server 30 recognizes by the object management layer 32 that received this event that the state of the disk subsystem 20 was changed. After this event was recognized, the management server 30 acquires the configuration information of the system 20 and updates the information about the configuration information database.

Besides, when the configuration of the disk subsystem 20 was modified according to automatic expansion, fault and maintenance events, the management server 30 specifies the modification and registers it in its own configuration information database 321. Here, if the flag is set in the disk subsystem 20 of the configuration information database that the management server 30 possesses and the database is managed, the subsequent processing, especially, the acquisition of information is performed efficiently by making an inquiry into only the system 20 of which the flag is on in the database.

<Information Acquisition Method>

An example of a procedure in which desired setting is performed collectively extending over multiple disk subsystems using the above method is described with reference to FIG. 3. This procedure indicates that one of multiple system administrators define these configurations against the multiple disk subsystems 20 (two units X and Y here). In this example, a function unique to a disk subsystem that assigns an access authority from a host to a logical unit and prevents invalid access to the logical unit, then protects data is used.

Two disk subsystems 20 (X and Y) connected to the single specific host 10 (FIG. 1) possess the predetermined number of logical units. Under the environment where the multiple hosts 10 share the multiple disk subsystems 20, security needs to be set so that the logical unit that the specific host 10 accesses cannot be accessed from another host 10.

In FIG. 3, the system administrator S (user A) logs in the management server 30 and requests access permission (step 311). On receipt of this access permission, the management server 30 issues an exclusive control command to the disk subsystems 20 (X and Y) so that the management server 30 can become the only control server that enables the configuration setting of the whole system (step 312).

Figure 2:
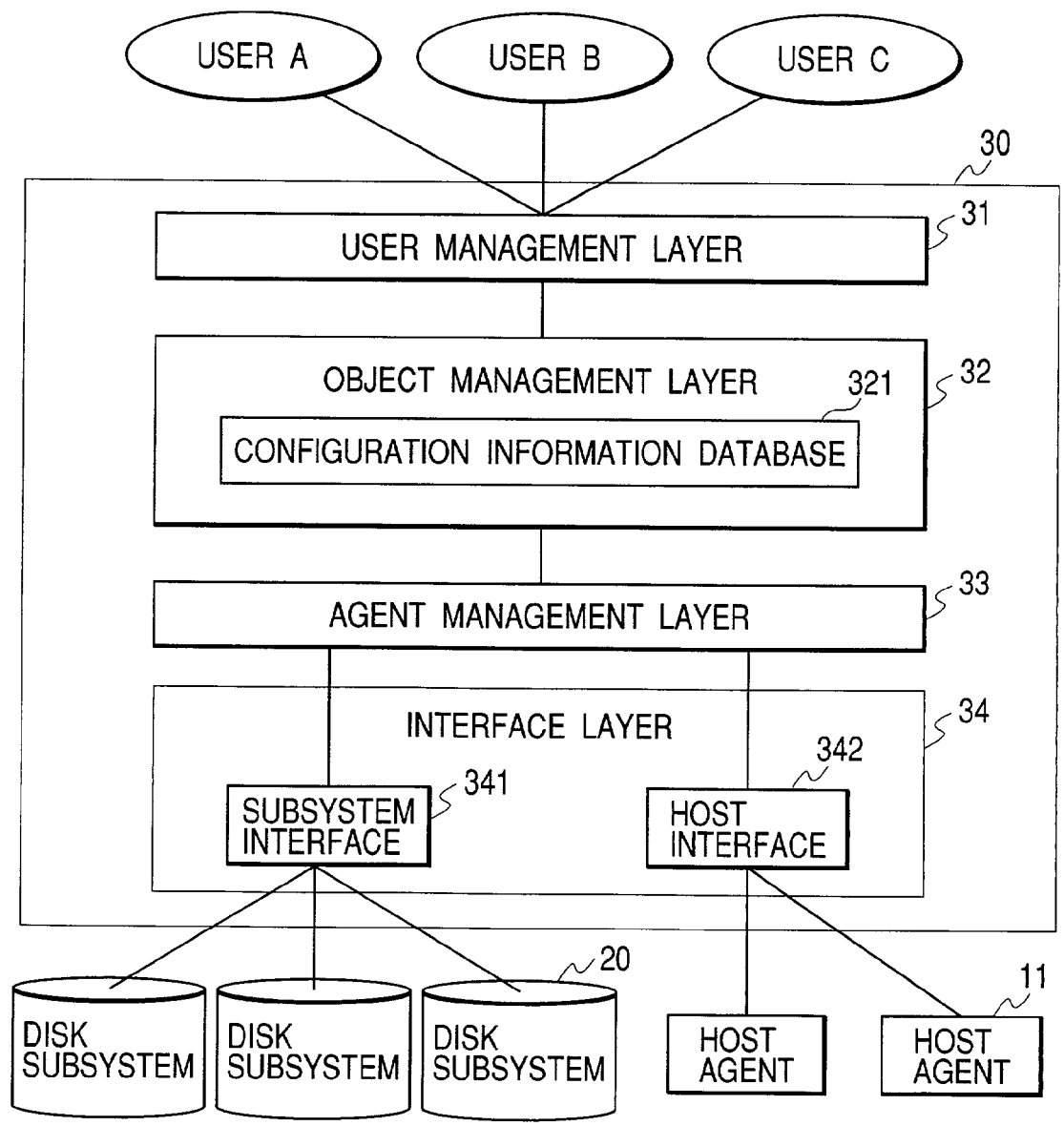
FIG. 2 is a drawing showing a functional block of a management server to which the present invention is applied.

The management server 30 acquires the configuration information of each of the disk subsystems X and Y when the exclusive control command is issued (step 313) and stores it in the configuration information database 321 in FIG. 2.

The only system administrator S (user A) whose access to the management server 30 was permitted makes a modification of the system configuration collectively extending over the disk subsystems X and Y (step 315) based on the configuration information of the disk subsystems X and Y stored in the configuration information database 321 (step 314).

Here, the modification of the configuration in this example indicates that the system administrator S assigns an "access authority from the specific host 10 to a predetermined logical unit" to the specific host 10. Specifically, it indicates that a unique address, for example, a WWN (World Wide Name) or MAC address is allocated in a network assigned to the logical unit that the host 10 under a port can access and a host bus adapter that the host connected to the port is equipped with. Here, the port indicates an input/output function used when the disk subsystem 20 sends and receives data to and from the host 10.

The management server 30 completes the modification of such system configuration including the registration into its own configuration information database (step 316) and releases the occupied multiple disk subsystems X and Y (step 317).

While the disk subsystems X and Y are controlled exclusively from the steps 312 to 317 of this example, even if another system administrator T (user B) issues a setting request to the management server 30 (step 318), the management server 30 posts to the system administrator T that the system administrator S is being set.

The management server 30 further associates the host logical configuration information with the configuration information of the disk subsystems X and Y according to the following procedure. Here, the host logical configuration information indicates the access path information to a logical unit viewed from a file on an operating system (hereinafter merely referred to as an OS), position of the logical unit in which the file was stored, file size, a database and each OS.

Besides, the access path to the logical unit viewed from each OS can be specified using three items of a host adapter card ID, a controller ID and a logical unit number, for example, if the OS is a UNIX-system OS.

Such associating is performed to make a file accessed from the host 10 and a logical unit inside the disk subsystem 20 that stores this file correspond to each other by linking an ID that indicates a physical area inside the system 20 and the information of a device path used when a system administrator incorporates the system 20 and to manage them collectively.

<Activation of Host Agent>

The multiple hosts 10 (FIG. 1) install the host agent 11 and the host agent 11 is activated synchronizing with a subsequent event in the following cases.

1) When the management server 30 modifies the configuration of the disk subsystem 20 according to a request of a system administrator and inquires each disk subsystem 20 of the acquisition of system configuration information 2) When the configuration of the disk subsystem 20 is modified by fault, maintenance and other events, and the management server 30 recognizes the status change of the disk subsystem 20 and inquires each disk subsystem 20 of the acquisition of system configuration information The host agent 11 issues a command for identifying an access path into the logical unit from its own host 10, to the logical unit of the disk subsystem 20 to which its own host 10 can access in order to acquire the "host logical configuration information" on the OS of the host 10 that dominates the host agent.

The host agent 11 acquires the name and size of the file stored inside the logical unit and the position on the file system to which the file belongs using an OS, a database or an application interface for high-level middleware.

The management server 30 collects the "host logical configuration information" that each host agent 11 acquired and associates it with an internal access path contained in the configuration information of the disk subsystem 20, then stores it in the configuration information database 321. A system administrator can check the position of the logical unit in which the file is stored by making an inquiry into the management server.

The management server 30 collects the data of file size that the host agent acquires and the application of the host 10 uses synchronizing with a periodic inquiry into each disk subsystems 20 and accumulates it in the configuration information database 321 of the management server 30 in point of time series.

The management server 30 similarly accumulates the contents before and after the system configuration was modified in the configuration information database of the management server 30 in point of time series also when a system administrator modified the configuration of the disk subsystem 20 and the configuration was modified by the fault and maintenance events.

As a result, a system administrator can momentarily retrieve the host logical configuration information and the modified contents of the system configuration against the time series data stored in the configuration information database of the management server 30 as keys. Accordingly, an interrelationship when the configuration of the disk subsystem 20 was modified with time concerning the performance, file size and other parameters of the disk subsystem can be found and analyzed.

<Specific Example 1 of Analysis>

Specific examples are described below.

The first specific example is the case where a problem is analyzed using the management server to which the present invention applied when the following event occurred.

The case is considered where a certain user A uses a database and another application in the host 10, and a system administrator added a logical unit to the disk subsystem 20 that uses the application to expand the file size. In this case, the addition of a physical unit can also follow the addition of the logical unit. However, the disk subsystem 20 may also use another application B (higher performance than for the application A is requested) that the user B uses in another host.

In such time as this, if the added logical unit should have shared a physical resource (physical unit) with the logical unit allocated so that the application B that requests high performance can be used, the addition of this logical unit is affected and performance degradation will be caused concerning the execution of the application B in which importance is attached to the performance. In the past, when a system administrator monitors the performance of the application, an external performance monitoring tool was used because monitoring cannot be performed from a management server. This type of the tool monitors the process operating state of the application and the read and write performance from and to a file used. However, a cause that the addition of such logical unit as above gave rise to the performance degradation of the application could not be ascertained.

FIG. 4 shows a measure for which the system administrator S can take using the management server 30 to which the present invention applied (using the historical data of the configuration information database 321 when the performance of the application was degraded after a certain point of time.

The information that specifies a file that an application uses and the time when the performance of the application was degraded are input to the management server 30 (step 411). The management server 30 that received the input specifies a physical unit storage position indicating a logical unit that corresponds to the file is positioned at which physical area in the disk subsystem 20, based on the data of the configuration information table 301 in the configuration information database 321. Subsequently, another logical unit that shares the physical unit is retrieved (step 412).

The contents of a setting change related to the physical unit storage position are retrieved from the data in which a history of the setting change, for example, the setting change historical table 302 is accumulated before the time when the performance of the application was degraded using this retrieval result (step 413).

As to whether the setting change is related to the performance degradation of an application or not, the management server 30 checks that the performance of the logical volume is degraded after the performance degradation time of the application, referring to a performance historical table 303 that indicates the performance history of a logical unit, for example (step 414). If the performance is degraded, the fact (estimated cause or additional time) that the relevant setting change is assumed to be a cause is posted to the system administrator (step 415).

<Specific Example 2 of Analysis>

The second specific example is the case where a problem is analyzed using the management server 30 to which the present invention applied when the following event occurred.

A system administrator periodically, for example, quarterly, investigates an increasing tendency toward the file size that an application uses, and arranges a schedule of the additional capacity of the logical unit that the disk subsystem 20 retains against this increasing tendency. On this occasion, the management server supports planning according to the following procedure.

Figure 5:
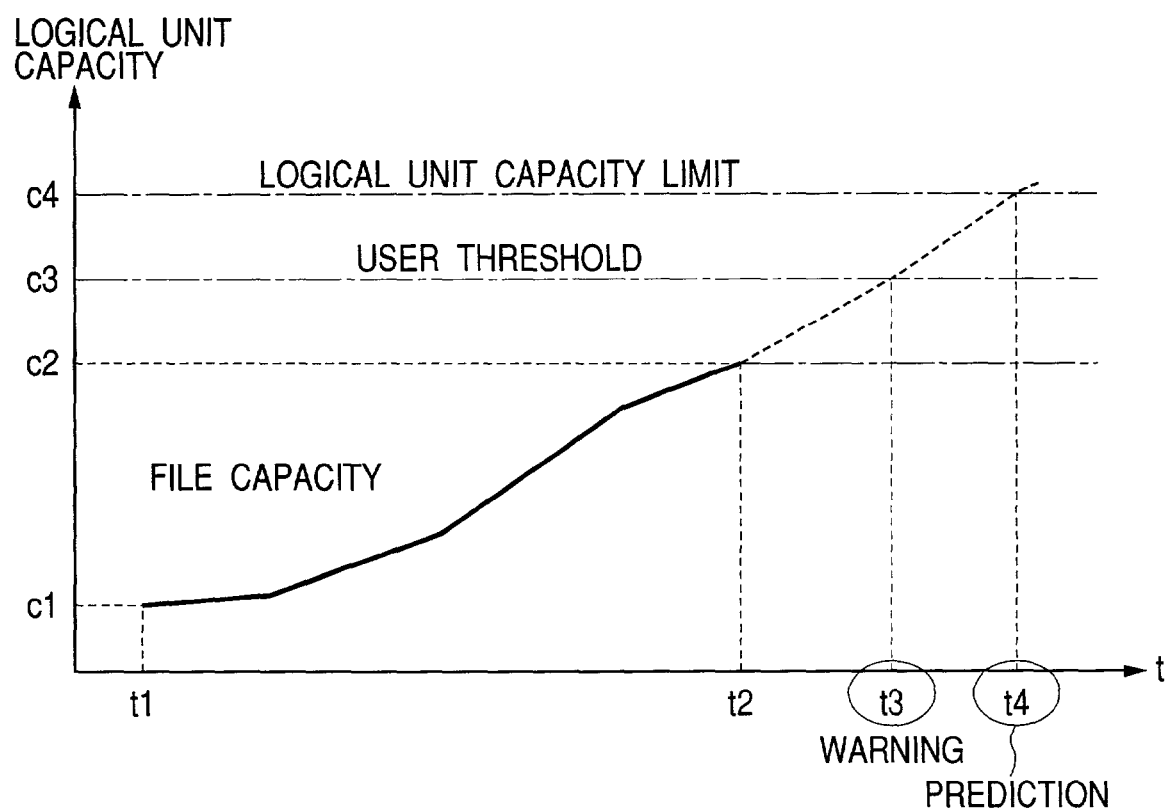
FIG. 5 is an example of analysis made using the present invention and a drawing showing a flow of analyzing the expansion schedule of a logical unit using a history of file-size possessed by the management server.

The management server 30 periodically inquires the host agent 11 of the file size and accumulates the file size in a database in point of time series. Subsequently, the management server 30 retrieves associating with the logical unit in which the file was stored from the contents of the configuration information database 321. As shown in FIG. 5, based on the capacity (c4) of the logical unit and the relationship between the file size accumulated in point of time series and time, for example, the data of start capacity (c1, t1) and the latest capacity (c2, t2), the time (t4) when the file size is equal to the logical unit capacity limit (c4) is predicted and is posted to a system administrator as the time when the logical unit needs to be added, for example, additional time.

A system administrator previously sets a file size threshold, for example, user threshold (c3). When the file size exceeded the user threshold (at t3), the system administrator is warned against the fact that the addition of the logical unit will be required in the near future.

Further, as the high-level application of the management server 30, there is an application that manages the connection modes of the host 10, switches (not shown) and the disk subsystem 20 those are the components of the SAN 40, and that manages the information about each component in a centralized manner, and that is provided with a function of performing fault monitoring and performance display, then performs centralized management. This high-level application can acquire the time series information and history of the configuration and performance of each disk subsystems 20 collectively by making an inquiry into the management server 30 without making any inquiry into each component.

This high-level application is used by multiple system administrators (or users) and the management of multiple disk subsystems can be performed by the centralized management of an exclusive control command and a configuration information database.

According to the above embodiment, in the configuration of the multiple disk subsystems shared from multiple hosts, there is an effect in which multiple system administrators can collectively define the system configuration that extends over the multiple disk subsystems.

Further, the historical management of the system configuration can be performed using the configuration information database in which the configuration information of the whole system was accumulated in point of time series.

Furthermore, there is an effect in which an influence that the modification of the system configuration has on an application can be estimated correctly. The cause of the performance degradation of the application can be investigated.

Furthermore, there is an effect in which the modification time of the system configuration and the additional time of the logical unit capacity can be planned, estimated and posted.

According to the invention, in the configuration of multiple (M units of) disk subsystems shared by multiple (N units of) hosts, multiple system administrators (L persons) can manage the M units of disk subsystems transversely and collectively and realize predetermined setting quickly and simply.

The administrators can grasp an influence that a change of the system configuration gives, in an application executed by a host. The addition time according to plan with logical unit capacity in the system can be determined.

Because the configuration information of the whole storage system can be managed in a centralized manner in point of time series, the degradation of the application performance caused by the modification of the system configuration, the addition with logical unit capacity into the storage system according to plan, and the analysis and prediction of the other events can be performed easily.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A control method of a data storage system in which multiple external storage systems that store information are connected to a first network and each of said multiple external storage systems is arranged separately, comprising:
   generating an interrupt by an external storage system to a management server;
   issuing an exclusive control command by said management server to said external storage system, wherein said exclusive control command temporarily limits access to said external storage system such that said management server is the only control server that enables configuration setting of the data storage system;
   receiving by said management server, configuration information from said external storage system in response to said command; and
   storing in a database at said management server said configuration information that said management server received,
   wherein said management server acquires configuration information of said external storage systems in point of time series and stores said configuration information in the database managed by said management server using said exclusive control command, and
   wherein a time series acquisition is made with a simultaneous and periodic inquiry into multiple external storage systems as moments.

2. A control method of a data storage system in which multiple external storage systems that store information are connected to a first network and each of said multiple external storage systems is arranged separately, comprising:
   issuing an exclusive control command by a management server to multiple external storage systems, wherein said exclusive control command temporarily limits access to said external storage system such that said management server is the only control server that enables configuration setting of the data storage system;
   receiving by said management server, configuration information from said external storage system in response to said command; and
   storing in a database at said management server, configuration information that said management server received,
   wherein said management server acquires configuration information of said external storage systems in point of time series and stores said configuration information in the database managed by said management server using said exclusive control command, and
   wherein a time series acquisition is made with a simultaneous and periodic inquiry into multiple external storage systems as moments.

3. A control method of a data storage system in which multiple computers that use information and multiple external storage systems that store information are connected to a network respectively and each of said multiple external storage systems is arranged separately, comprising:
   logging on to a management server to request access permission;
   issuing an exclusive control command by said management server to said external storage systems, wherein said exclusive control command temporarily limits access to said external storage systems such that said management server is the only control server that enables configuration setting of the data storage system;
   receiving by said management server configuration information from said external storage systems in response to said command; and
   storing in a database at said management server said configuration information that said management server received,
   wherein said management server acquires configuration information of said external storage systems in point of time series and stores said configuration information in the database managed by said management server using said exclusive control command, and
   wherein a time series acquisition is made with a simultaneous and periodic inquiry into multiple external storage systems as moments.

4. The control method of the data storage system according to claim 3, wherein said management server acquires configuration information of said all external storage systems and stores said configuration information in the database managed by said management server using said exclusive control command.

5. The control method of the data storage system according to claim 3, further comprising:
   activating application programs of said multiple computers based on said exclusive control command issued by said management server; and receiving by said management server, host logical configuration information from said multiple computers.

6. The control method of the data storage system according to claim 5, wherein said configuration information stored in said database and said host logical configuration information are associated and stored in a database.

7. A control method of a data storage system in which multiple computers that use information and multiple external storage systems that store information are connected to a network respectively and each of said multiple external storage systems is arranged separately, comprising:
  logging on to a management server to request access permission;
  sending configuration information by said management server;
  instructing said management server to change said configuration information;
  issuing an exclusive control command by said management server to multiple external storage systems, wherein said exclusive control command temporarily limits access to said external storage system such that said management server is the only control server that enables configuration setting of the data storage system;
  receiving by said management server the completion of a setting of said configuration information from said external storage systems in response to the command; and
  storing in a database at said management server, a change of said configuration information.

8. The control method of the data storage system according to claim 7, wherein said configuration information that said management server handles includes:
  setting concerning an internal access path of an external storage system, a logical unit, capacity of the logical unit, an access authority to the logical unit, or data move;
  setting concerning data copy between said external storage systems;
  setting or acquisition of performance control modes or performance data of said external storage systems; or
  setting of a data storage system maintenance method, fault occurrence, fault notification, or user operation.

9. The control method of the data storage system according to claim 7, wherein an external storage system that is an object of a change of its configuration information is recognized and said exclusive control command is issued to only said external storage system.

10. A control method of a data storage system in which multiple computers that use information and multiple external storage systems that store information are connected to a network respectively and each of said multiple external storage systems is arranged separately, comprising:
  issuing an exclusive control command by a management server to multiple external storage systems, wherein said exclusive control command temporarily limits access to said multiple external storage systems such that said management server is the only control server that enables configuration setting of the data storage system;
  receiving by said management server configuration information from said external storage systems in response to said command;
  activating application programs of said multiple computers based on said exclusive control command issued by said management server;
  receiving by said management server, host logical configuration information from said multiple computers; and
  storing in a database at said management server said received configuration information and host logical configuration information,
  wherein said management server acquires configuration information of said external storage systems in point of time series and stores said configuration information in the database managed by said management server using said exclusive control command, and
  wherein a time series acquisition is made with a simultaneous and periodic inquiry into multiple external storage systems as moments.

11. The control method of the data storage system according to claim 10, further comprising:
  generating an interrupt by said external storage systems to said management server.

12. The control method of the data storage system according to claim 10, wherein said management server acquires configuration information of the whole data storage system in point of time series and associates said configuration information of the whole data storage system in point in time series, then stores said configuration information of the whole data storage system in point in time series in a database of the management server using the exclusive control command.

13. A control method of a data storage system in which multiple computers that use information and multiple external storage systems that store information are connected to a network respectively, each of said multiple external storage systems is arranged separately, and the data storage system has a management server connected via a first network, comprising:
  inputting a file type and time that said multiple computers use, to said management server;
  retrieving by said management server a configuration information database and displaying a physical storage position of a logical unit that corresponds to a file;
  retrieving another logical unit related to said physical storage position and displaying said another logical unit;
  retrieving data in which a modification history of said data storage system is accumulated, and displaying modified contents of said data storage system related to said storage position before said time;
  retrieving data in which a performance history of a logical unit is accumulated, and displaying a performance of a logical volume after said time; and
  displaying or posting said modified contents of said system when the performance of said logical volume is degraded,
  wherein said management server acquires configuration information of said external storage systems in point of time series and stores said configuration information in the database managed by said management server using said exclusive control command, and
  wherein a time series acquisition is made with a simultaneous and periodic inquiry into multiple external storage systems as moments.

14. A control method of a data storage system in which multiple computers that use information and multiple external storage systems that store information are connected to a network respectively, each of said multiple computers and said multiple external storage systems is arranged separately, and the data storage system has a management server connected via a first network, comprising:

inquiring by the management server, to a computer of the size of a file that an application software of said computer uses, and receiving a response in point of time series; and retrieving by said management server, association between a logical disk unit and said file that was stored in the unit from contents of a configuration Information database, and indicating a relationship between the capacity of said logical disk unit and the size of said file in point of time series, wherein a time series acquisition is made with a simultaneous and periodic inquiry into multiple external storage systems as moments.

15. The control method of the data storage system according to claim 14, wherein said relationship predicts, displays or posts the time when said capacity of said logical disk unit and said file size become equal using the contents of said configuration Information database.

16. A data storage system in which multiple external storage systems that store information are connected to a network and each of said multiple external storage systems is arranged separately, each external storage system has an external connection interface that sends event information in order to define or refer to its own configuration, show performance and data or post a fault, comprising:
- a management server part, which is connected to said multiple external storage systems; and
- a configuration information database that accumulates a time for each event and the corresponding event information of said multiple external storage systems via said external connection interface,
- wherein said management server part issues an exclusive control command to said multiple external storage systems when the time for each event and the corresponding event information in said configuration information database is accumulated,
- wherein said management server acquires configuration information of said external storage systems in point of time series and stores said configuration information in the database managed by said management server using said exclusive control command, and
- wherein a time series acquisition is made with a simultaneous and periodic inquiry into multiple external storage systems as moments.

17. A data storage system in which multiple computers that use information and multiple external storage systems that store information are connected to a network respectively and each of said multiple external storage systems is arranged separately, each computer installs an application for acquiring its own host logical configuration information, each external storage system has an external connection interface that sends event information in order to define or refer to its own configuration, to show performance and data, or to post a fault, comprising:
- a management server part; and
- a configuration information database,
- wherein the management server part is connected to said external storage systems and accumulates a time for each event and the corresponding event information of said multiple external storage systems via said external connection interface into said configuration information database, and
- wherein the management server part is connected to said computers and accumulates host logical configuration information of said multiple computers via said network, in point of time series,
- wherein said management server part comprises a function that posts the time when the size of a file that an application of said computer uses reaches the capacity of a logical disk unit of said external storage system, and
- wherein a time series acquisition is made with a simultaneous and periodic inquiry into multiple external storage systems as moments.

18. The data storage system according to claim 17, wherein said management server part makes said event information of said multiple external storage systems and said host logical configuration information correspond to each other when they are accumulated in said configuration information database in point of time series.

19. The data storage system according to claim 18, wherein said management server part comprises a function of retrieving said configuration information database by specifying a file and time information said computers handle.

20. The data storage system according to claim 18, wherein said management server part comprises a function of displaying a modification history of a system configuration or a history of a system performance.

* * * * *